United States Patent
Kim

(10) Patent No.: US 7,840,909 B2
(45) Date of Patent: Nov. 23, 2010

(54) PORTABLE COMPUTING APPARATUS AND PROCESSING METHOD USING THE SAME

(75) Inventor: Yun-Jung Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 922 days.

(21) Appl. No.: 11/601,722

(22) Filed: Nov. 20, 2006

(65) Prior Publication Data
US 2007/0143518 A1    Jun. 21, 2007

(30) Foreign Application Priority Data
Dec. 21, 2005  (KR) .............. 10-2005-0127107

(51) Int. Cl.
*G06F 3/048* (2006.01)
(52) U.S. Cl. ............................ 715/810; 715/764
(58) Field of Classification Search .......... 345/1.1, 345/1.2, 156, 168, 169; 715/764, 810
See application file for complete search history.

(56) References Cited

U.S. PATENT DOCUMENTS

| 6,538,880 | B1 | 3/2003 | Kamijo et al. | |
| 6,668,177 | B2 * | 12/2003 | Salmimaa et al. | 455/566 |
| 6,727,920 | B1 * | 4/2004 | Vineyard et al. | 715/810 |
| 6,809,724 | B1 * | 10/2004 | Shiraishi et al. | 345/169 |
| 6,842,795 | B2 * | 1/2005 | Keller | 710/15 |
| 6,928,543 | B2 * | 8/2005 | Hendry et al. | 713/100 |
| 7,002,604 | B1 * | 2/2006 | Barrus et al. | 345/649 |
| 7,007,246 | B2 * | 2/2006 | Yamaguchi et al. | 715/864 |
| 2002/0158913 | A1 * | 10/2002 | Yamaguchi et al. | 345/810 |

FOREIGN PATENT DOCUMENTS

| CN | 1295273 | 5/2001 |
| JP | 10-207574 | 8/1998 |
| JP | 2002-259027 | 9/2002 |
| JP | 2005-80020 | 3/2005 |
| KR | 2001-73673 | 8/2001 |
| KR | 2002-65779 | 8/2002 |
| KR | 2004-34233 | 4/2004 |
| WO | WO 2005/036332 | 4/2005 |

OTHER PUBLICATIONS

Office Action issued in corresponding Chinese Patent Application No. 200610164282.4 dated Feb. 15, 2008.
Office Action issued by Korean Intellectual Property Office in Korean Patent Application No. 1998-1042713 on Apr. 30, 2007.

* cited by examiner

*Primary Examiner*—My-Chau T Tran
(74) *Attorney, Agent, or Firm*—Jefferson IP Law, LLP

(57) ABSTRACT

A portable computing apparatus and a processing method using the same, the portable computing apparatus including a management module and a processing module, wherein the management module provides a predetermined function list to a sub-display module when a specific event occurs, and the processing module processes a function selected from the function list by a user.

24 Claims, 8 Drawing Sheets

PORTABLE COMPUTING APPARATUS AND PROCESSING METHOD USING THE SAME

CROSS-REFERENCE TO RELATED APPLICATION

This application claims the benefit of Korean Patent Application No. 2005-127107 filed on Dec. 21, 2005 in the Korean Intellectual Property Office, the disclosure of which is incorporated herein by reference.

BACKGROUND OF THE INVENTION

1. Field of the Invention

Aspects of the present invention relate to a portable computing apparatus and, more particularly, to a portable computing apparatus and a processing method using the same in which simple functions can be performed when the cover of the portable computing apparatus is closed.

2. Description of the Related Art

Currently, portable computing apparatuses, such as notebook-sized personal computers, are in common use. The portable computing apparatuses have an advantage in that they are easy to carry, making them convenient for users who, for example, must conduct business while traveling. Furthermore, with the development of wireless network technology, it has become easy to connect to a network, such as the Internet, using the portable computing apparatuses even when outdoors. Thus, the utility of the portable computing apparatuses is gradually increasing.

Generally, a portable computing apparatus includes a cover. In order for a user to use the portable computing apparatus, the cover is opened before the portable computing apparatus is booted. Therefore, when the user intends to use the simple functions of the portable computing apparatus, the conventional technology is inconvenient in that the cover must be opened, the portable computing apparatus must be booted, and the operating system must be running every time.

SUMMARY OF THE INVENTION

Accordingly, aspects of the present invention provide a portable computing apparatus and a processing method using the same, in which simple functions can be performed while the cover of the portable computing apparatus is closed.

According to an aspect of the present invention, there is provided a portable computing apparatus, including a management module providing a predetermined function list to a sub-display module when a specific event occurs; and a processing module processing a function selected from the predetermined function list by a user.

According to another aspect of the present invention, there is provided a processing method using a portable computing apparatus, the method including providing a predetermined function list to a sub-display module when a specific event occurs; and processing a function selected by a user from the predetermined function list.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
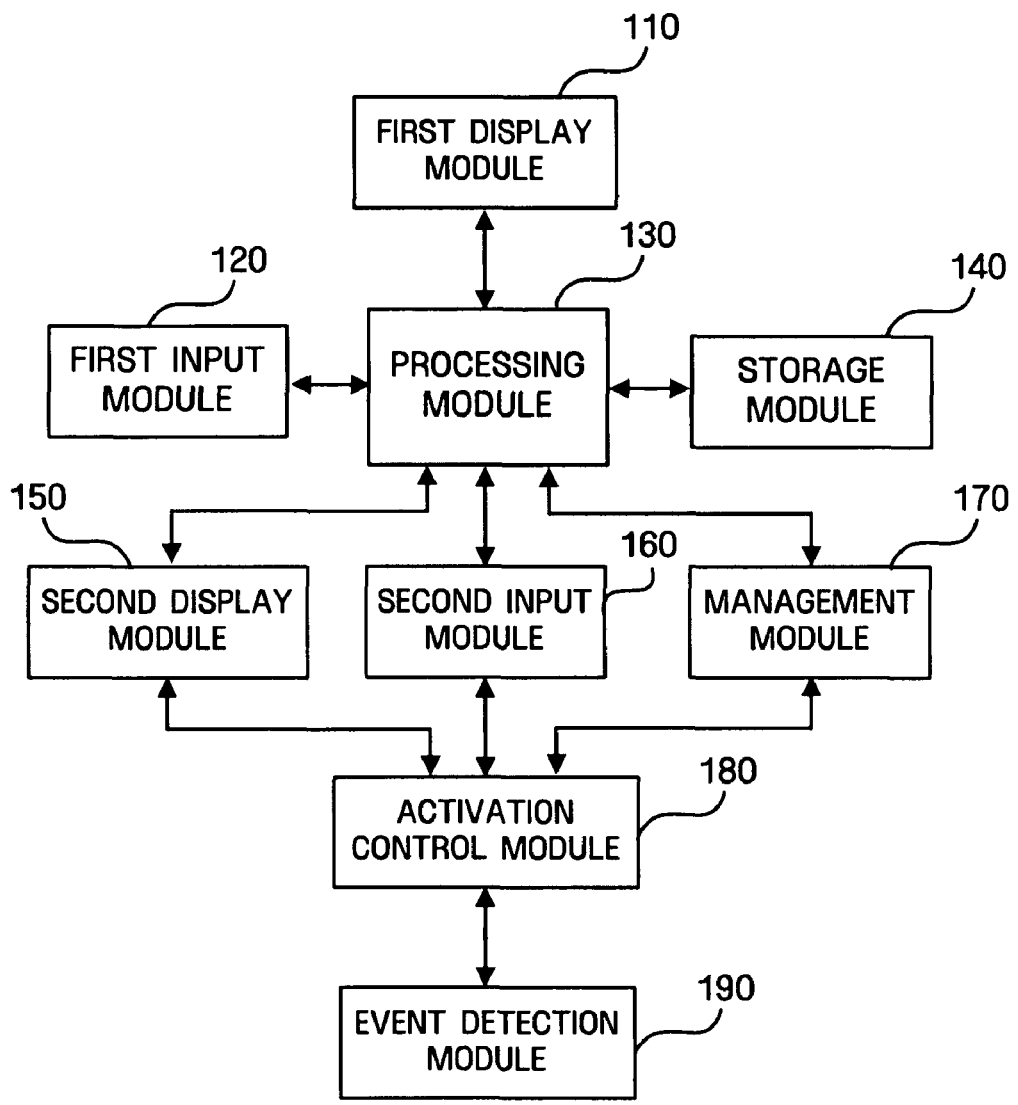
FIG. 1 is a block diagram showing a construction of a portable computing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing a construction of a portable computing apparatus according to an embodiment of the present invention. The portable computing apparatus 100, as shown in FIG. 1, includes a first display module 110, a first input module 120, a processing module 130, a storage module 140, a second display module 150, a second input module 160, a management module 170, an activation control module 180, and an event detection module 190. The portable computing apparatus 100 is exemplified by a notebook computer. Although the following description of the portable computing apparatus 100 is made based on a notebook computer, it is understood that the present invention is not limited thereto.

Figure 2:
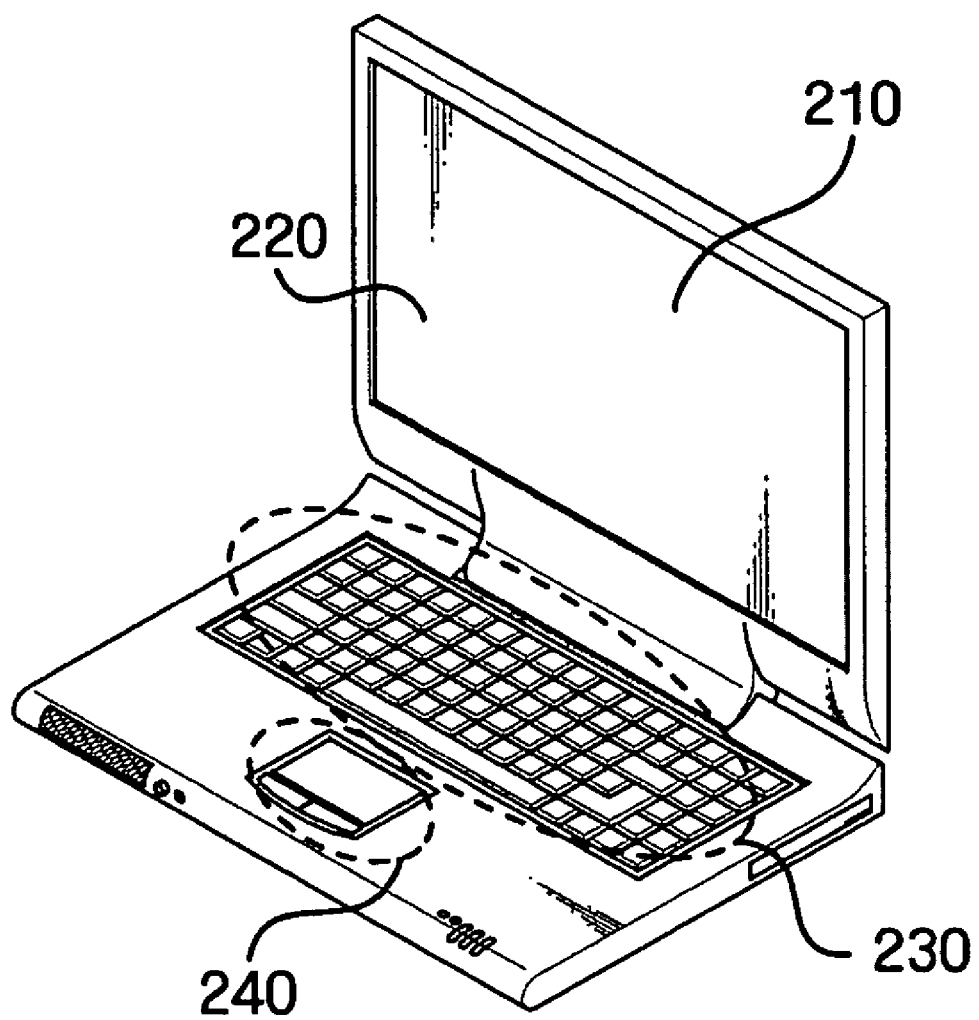
FIG. 2 is a diagram showing a notebook computer, the cover of which is open according to an embodiment of the present invention.

The first display module 110 is the main display of the portable computing apparatus 100, and displays various function processing states of the processing module 130. In the case where the portable computing apparatus 100 is a notebook computer, the first display module 110 may be a flat panel display 210, as shown in FIG. 2, located inside the cover 220 of the notebook computer. Alternatively, the first display module 110 may be implemented using a Liquid Crystal Display (LCD), a Plasma Display Panel (PDP), or an organic Electro Luminescence (EL) display, although not limited thereto.

The first input module 120 receives predetermined control commands inputted by a user. For this purpose, the first input module 120 includes an input device, such as, although not limited to, a plurality of buttons, a touch pad, and/or a ball mouse. Representative examples of the first input module 120 include a keyboard 230 and the touch pad 240 of the notebook computer as shown in FIG. 2. However, it is understood that the first input module 120 can receive the predetermined control commands through other means and/or devices. Processing results of the processing module 130, in response to the control commands inputted by the user through the first input module 120, can be checked through the first display module 110.

Figure 3:
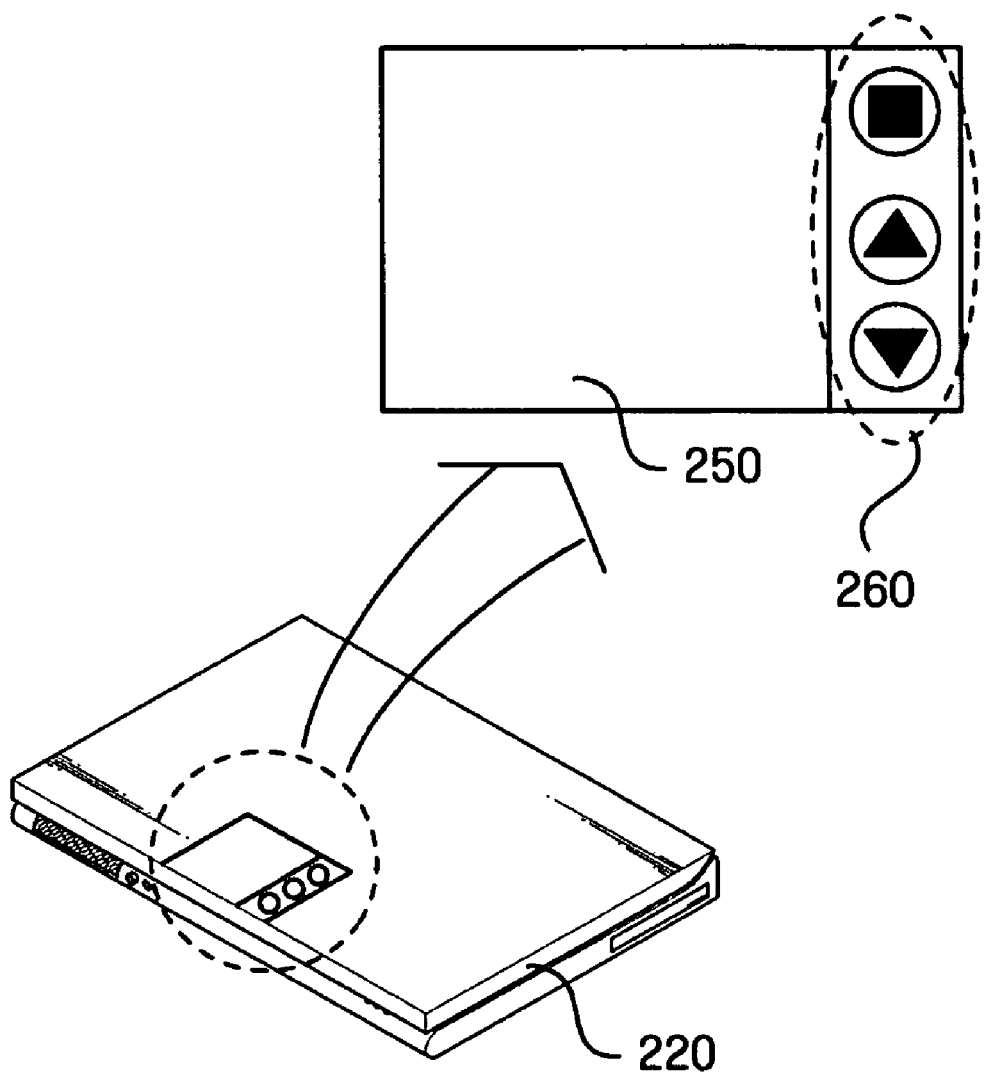
FIG. 3 is a diagram showing the notebook computer, the cover of which is closed according to an embodiment of the present invention.

The second display module 150 is the auxiliary display of the portable computing apparatus 100, and displays predetermined function processing states of the processing module 130. Unlike the first display module 110, the second display module 150 may, although not necessarily, be provided on an outer surface of the portable computing apparatus 100. For example, in the case where the portable computing apparatus 100 is a notebook computer, the second display module 150 may be a flat panel display 250, as shown in FIG. 3, located on an outside of the cover 220 of the notebook computer. The second display module 150 may be implemented using an LCD, a PDP, or an organic EL display, although not limited thereto.

The second input module 160 receives predetermined control commands from the user. The second input module 160 may be implemented using one or more buttons or a touch screen. However, it is understood that the second input module 160 can receive the predetermined control commands through other means and/or devices. In the same manner as in the second display module 150, the second input module 160 may be installed on the outer surface of the portable computing apparatus 100. The second input module 160 may, although not necessarily, be located in a region 260 adjacent to the second display module 250, as shown in FIG. 3. The processing results of the processing module 130 in response to the control commands input by the user through the second input module 160 can be checked through the second display module 150.

According to an embodiment of the present invention, the operational modes of the portable computing apparatus 100 may, although not necessarily, be classified into a normal mode and a special mode. The normal mode is a mode in which a user uses the first display module 110 and the first input module 120, thus causing the portable computing apparatus 100 to perform normal tasks. Function processing states or results, which are generated by the operation of the processing module 130 in the normal mode, may be displayed through the first display module 110. In contrast, the special mode is a mode in which the user uses the second display module 150 and the second input module 160, thus causing the portable computing apparatus 100 to process specific functions. Function processing states and results, which are generated by the operation of the processing module 130 in the special mode, may be displayed through the second display module 150.

The processing module 130 processes predetermined functions according to the user's control commands inputted to and transferred from the first input module 120 and/or the second input module 160. In this case, the functions, which are processed by the processing module 130, may be classified into main functions and sub-functions. The main functions are related to predetermined applications based on the Operating System (OS) of the portable computing apparatus 100, such as, although not limited to, a word processor, a web browser, and a content player. The sub-functions may require a lesser amount of computational work than the main functions and occupy a small amount of memory in contrast to the main functions. In more detail, the sub-functions may be predetermined operational tasks that can be processed without depending on the OS. Examples of the sub-functions include, but are not limited to, a Basic Input Output System (BIOS) setting function, including a BIOS initial value restoration function and the low noise setting function of a portable computing apparatus; a system management function, including a disk defragmentation function and a power-saving function; an OS setting function, including a Data Execution Prevention (DEP) setting function; and a quick view setting function. Furthermore, the sub-functions may be relatively simple applications, such as a calculator, a calendar, schedule management and contact address management. It is understood that examples of the sub-functions are not limited to those aforementioned. Data or programs that the processing module 130 requires to process the predetermined functions may be acquired from the storage module 140.

According to an embodiment of the present invention, the portable computing apparatus 100 may, although not necessarily, include a plurality of processing modules to individually perform the functions in the normal mode and the special mode.

The storage module 140 stores the BIOS, various pieces of information about system setting, and some other application programs. In one embodiment, the storage module 140 may include main memory, such as Random Access Memory (RAM) or Read-Only Memory (ROM), and auxiliary memory, such as a hard disk.

The management module 170 provides a User Interface (UI) that may be displayed by the second display module 150 in the special mode. Furthermore, the management module 170 manages functions that are processed by the processing module 130 in the special mode.

When the event detection module 190 detects a predetermined event, the activation control module 180 activates the second display module 150, the second input module 160, and the management module 170.

The event detection module 190 detects the predetermined event. For example, the event detection module 190 can detect whether the cover of the portable computing apparatus 100 is open or closed, or whether a predetermined key signal is input.

The term 'unit,' as used herein, refers to, but is not limited to, a software or hardware component, such as a Field Programmable Gate Array (FPGA) or an Application Specific Integrated Circuit (ASIC), which performs certain tasks. A module may, although not necessarily, be configured to reside on the addressable storage medium and be configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables, although not limited thereto. The functionality provided for in the components and modules may be combined into fewer components and modules or may be further separated into additional components and modules.

Figure 4:
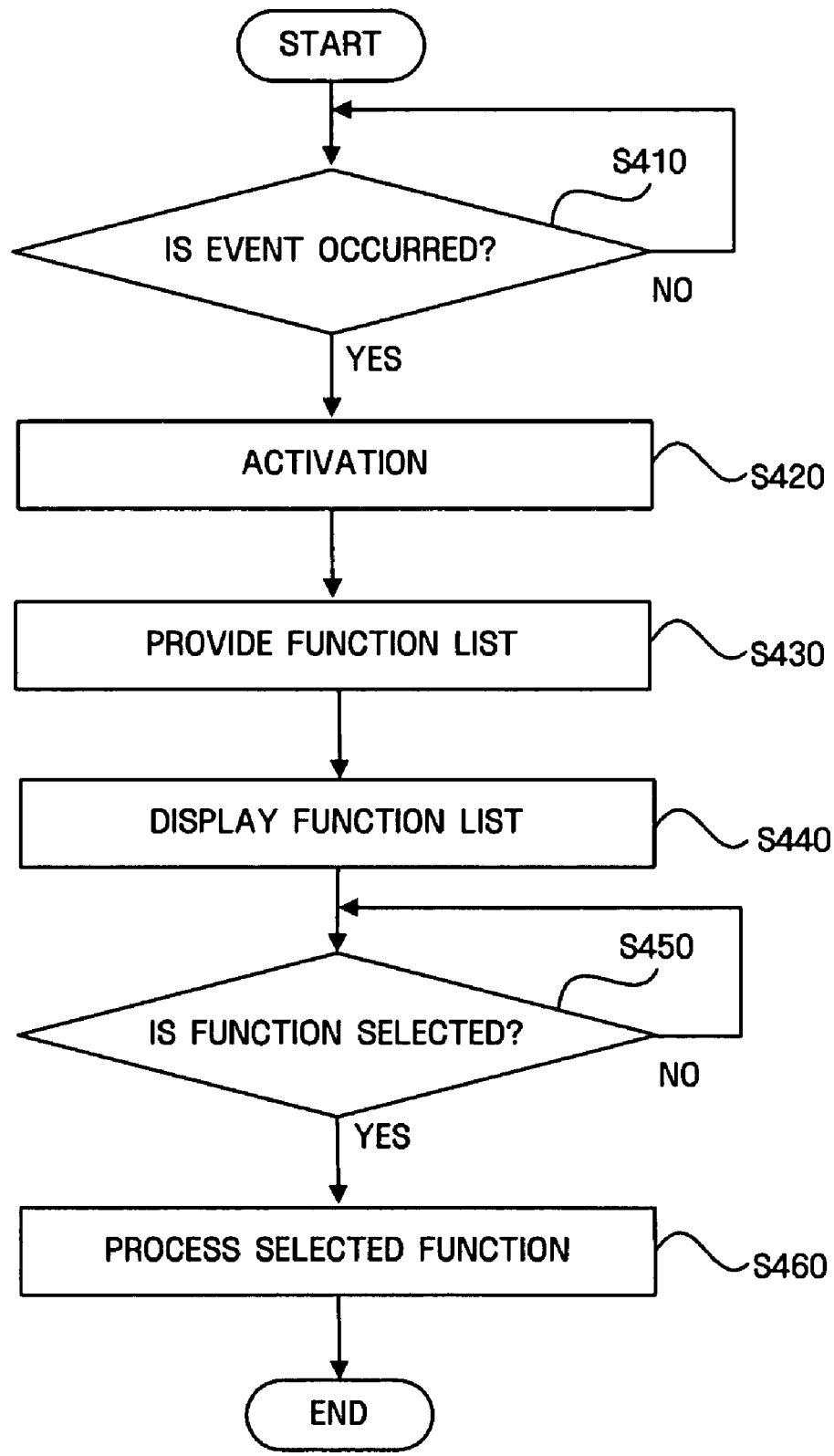
FIG. 4 is a flowchart illustrating a processing method using the portable computing apparatus according to an embodiment of the present invention.

FIG. 4 is a flowchart illustrating a processing method using the portable computing apparatus according to an embodiment of the present invention. First, if a predetermined event occurs at operation S410, the activation control module 180 activates at least one of the second display module 150, the second input module 160, and/or the management module 170 at operation S420. At operation S410, whether the event has occurred may, although not necessarily, be determined by detecting the closed state of the cover 220 of the portable computing apparatus 100 or the input of a predetermined key signal using the event detection module 190. In this case, the key signal may be output from a specific button included in the second input module 160 or from some other button that is not shown. In another embodiment, the event detection module 190 may determine the occurrence of the predetermined event where a predetermined key signal is input in the state in which the cover 220 of the portable computing apparatus 100 has been closed. However, it is understood that the closed state of the cover 220 is not the only example of the predetermined event of operation S410.

The management module 170, when activated, may provide a predetermined function list at operation S430, and the second display module 150 may display the function list at operation S440. In this case, the function list may, although not necessarily, be a list of functions that will be processed by the processing module 130 in the special mode and may, although not necessarily, be a list of auxiliary functions, such as the non-exclusive examples described above. When the function list is displayed, the user can select a desired function by manipulating the second input module 160 while viewing the function list through the second display module 150.

If a predetermined function is selected by the user through the second input module 160 at operation S450, the processing module 130 processes the selected function at operation S460. In this case, function processing states and results may be displayed through the second display module 150.

The process described with reference to FIG. 4 corresponds to the case where the portable computing apparatus 100 operates in the special mode. However, the portable computing apparatus 100 may operate in the normal mode or the special mode when the cover of the portable computing apparatus 100 is open, and may operate in the special mode or in the normal mode when the cover of the portable computing apparatus 100 is closed.

Detailed embodiments of a process in which the portable computing apparatus 100 processes predetermined functions in the special mode are described with reference to FIGS. 5A to 5D below. In FIGS. 5A to 5D, information displayed by the second display module 150 is information provided by the management module 170.

Figure 5A:
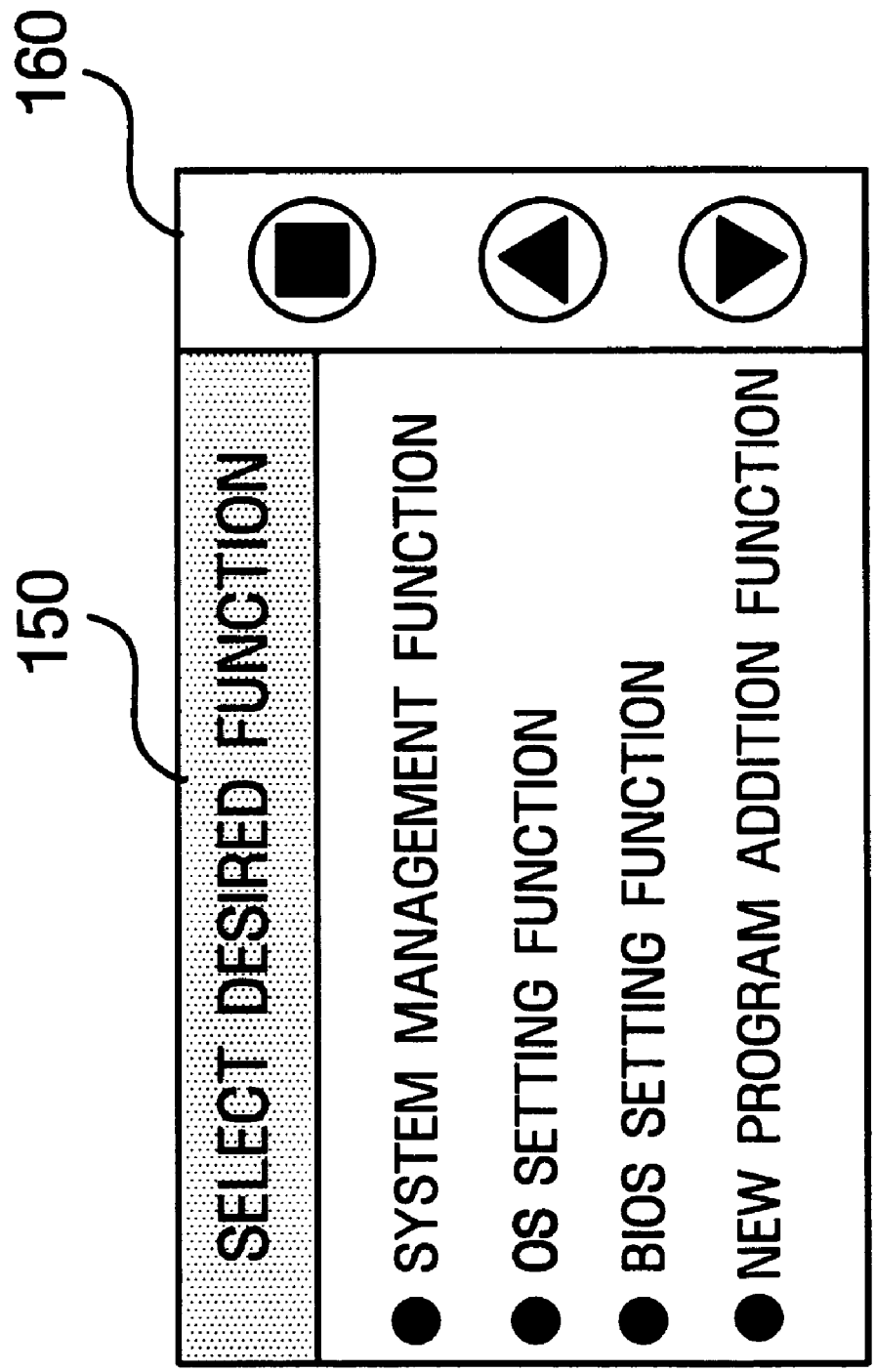
FIGS. 5A to 5D are diagrams illustrating a function processing process using the portable computing apparatus according to an embodiment of the present invention.

First, as shown in FIG. 5A, when the second display module 150 displays a predetermined function list, the user can select a desired function by manipulating the second input module 160.

Figure 5B:
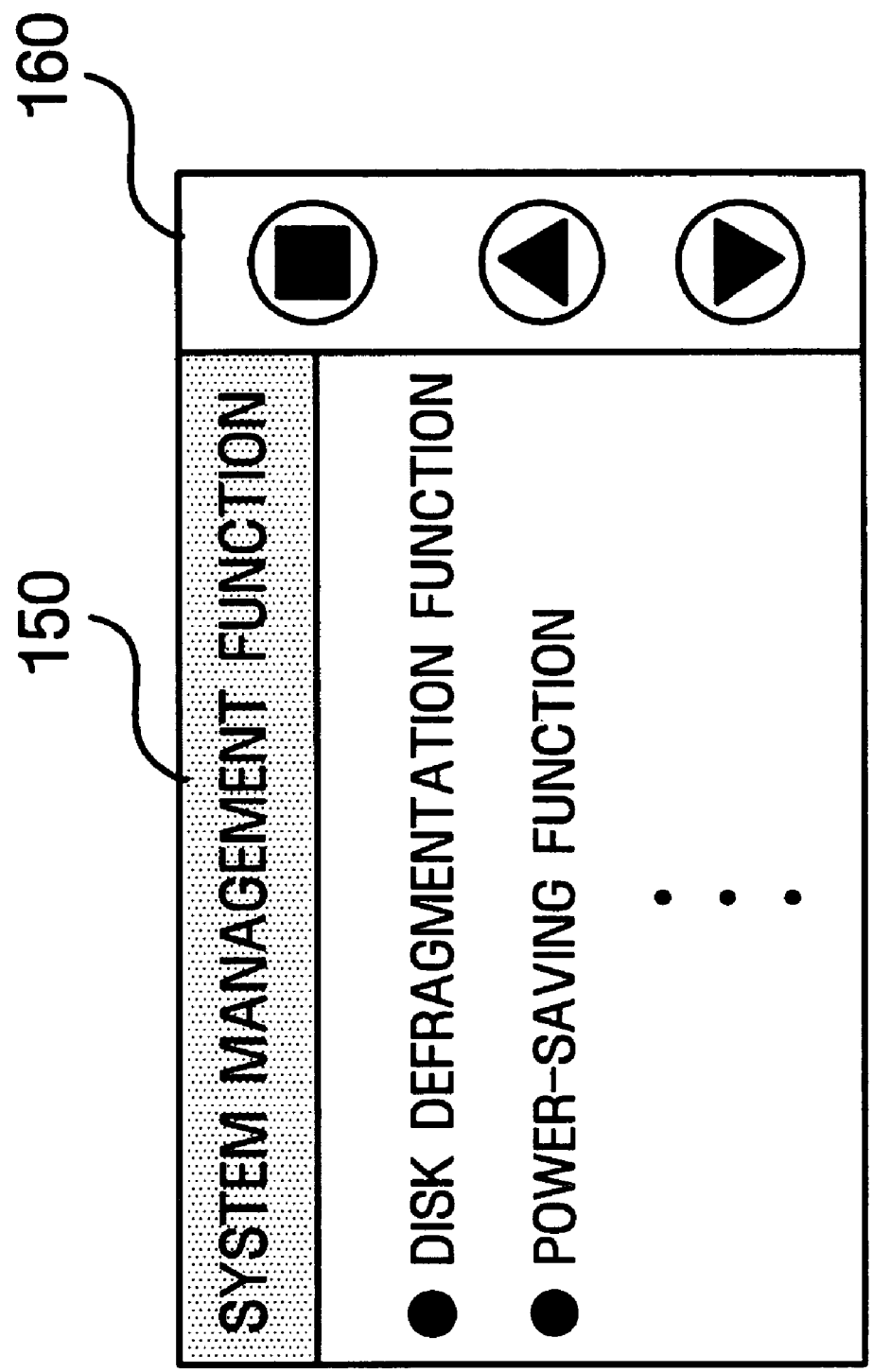
Figure 5C:
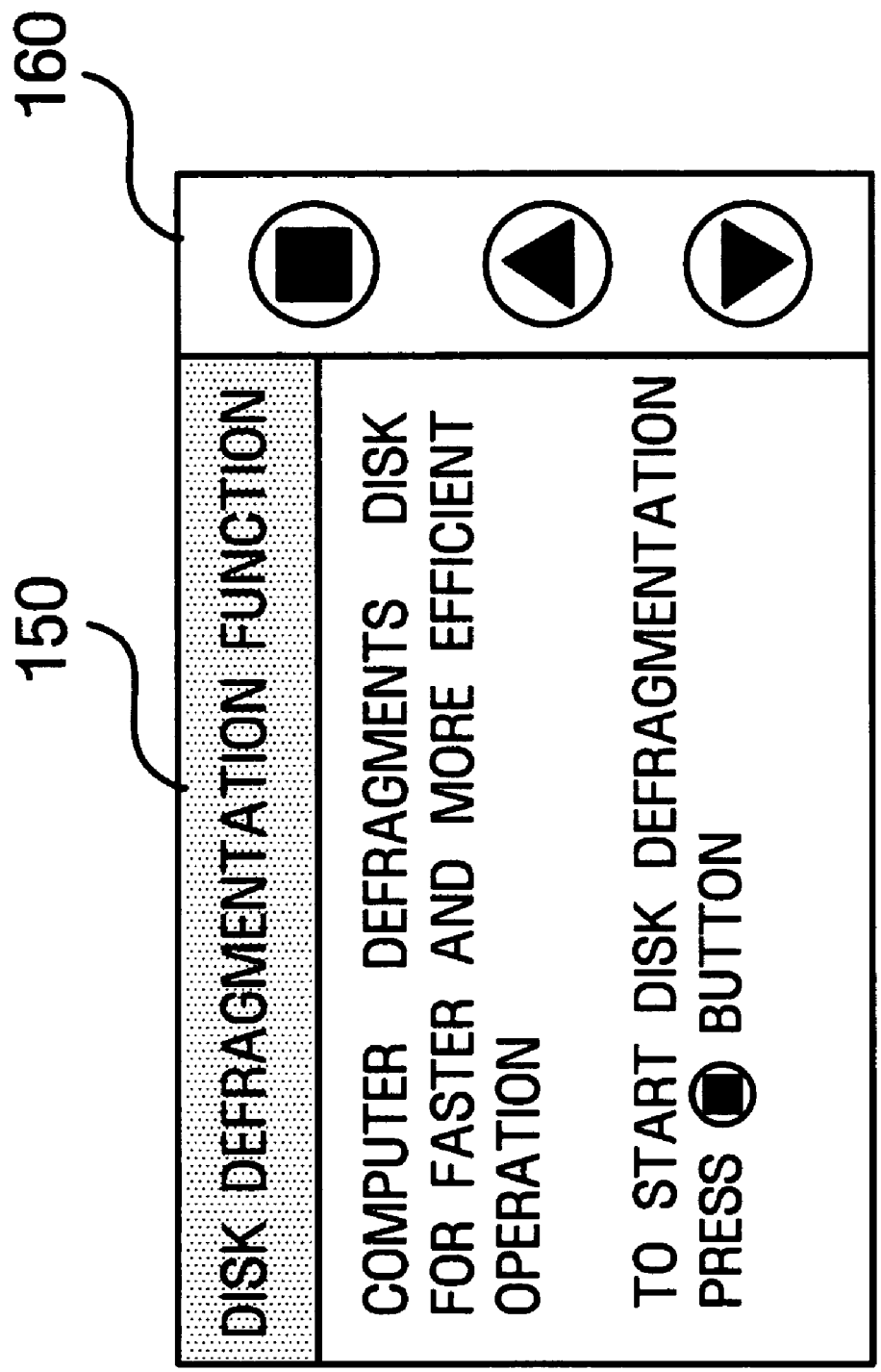

FIG. 5B is a diagram showing a case where the second display module 150 displays a function list included in the system management function when the user selects a system management function from the function list shown in FIG. 5A. When the user manipulates the second input module 160 and selects a disk defragmentation function, the second display module 150, as shown in FIG. 5C, displays a description of the disk defragmentation function.

When the user requests the execution of the disk defragmentation function through the second input module 160, the processing module 130 executes the disk defragmentation function.

Figure 5D:
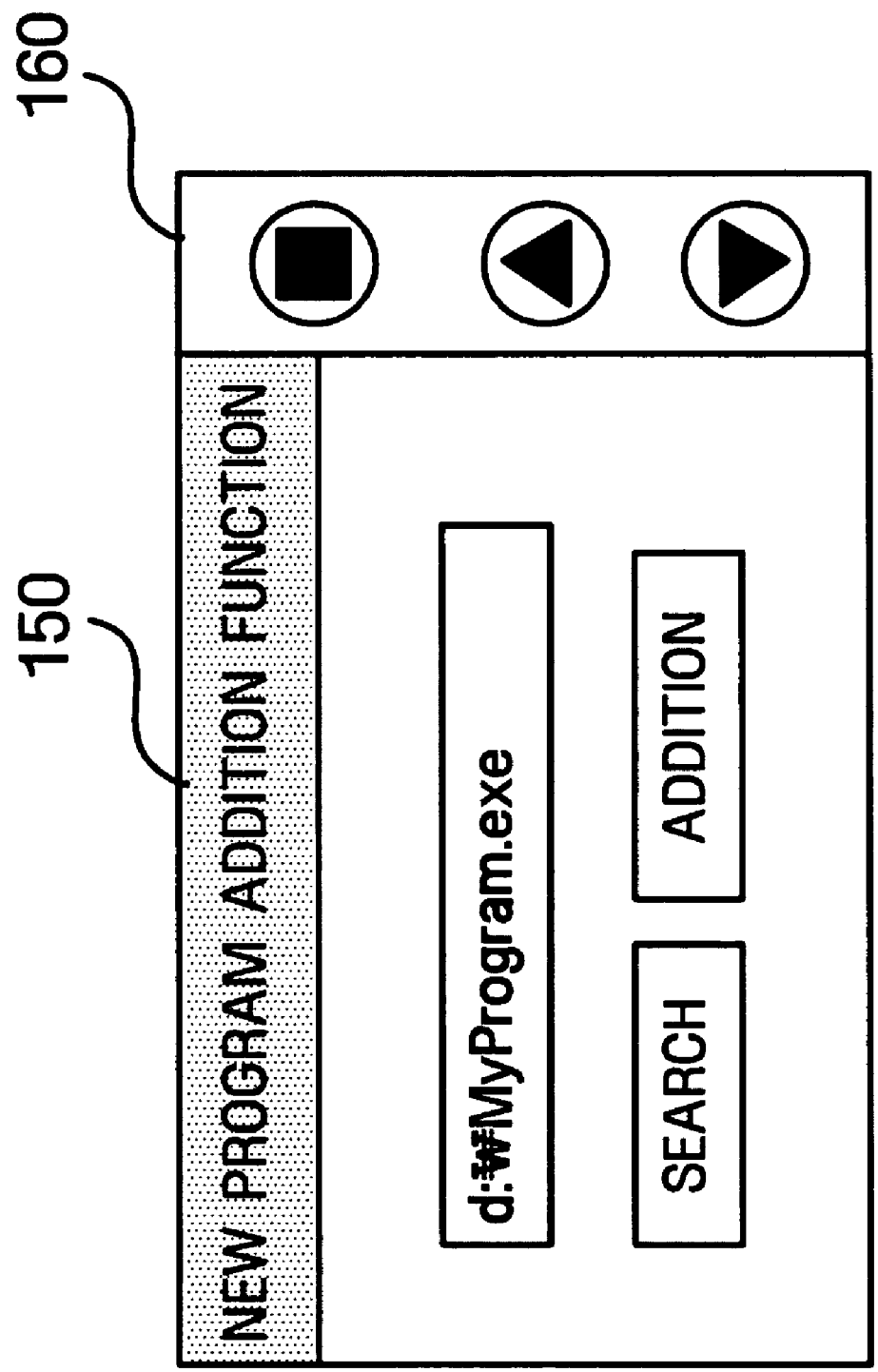

Meanwhile, according to an embodiment of the present invention, the user may add desired functions to the function list. For example, when the user manipulates the second input module 160 and selects a new program addition function when the UI shown in FIG. 5A is provided, the second display module 150, as shown in FIG. 5D, displays a program selection screen that allows a function, which will be added to the function list, to be selected. The user manipulates the second input module 160 and selects a desired program from among programs stored in the storage module 140, so that a new function can be added to the function list. The function list to which the added function is applied is managed by the management module 170 and may be provided at a later time when the portable computing apparatus 100 operates in the special mode.

As described above, the portable computing apparatus and processing method using the portable computing apparatus according to aspects of the present invention can process simple functions when the cover of the portable computing apparatus is closed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable computing apparatus provided with a first input module, the portable computing apparatus comprising:
    a processor which controls the operation of
        a first display module to display a first display mode;
        a second display module to display a second display mode; and
    a storage module to store a Basic Input Output System (BIOS) and information about a system setting,
    wherein, the first display mode requires a booting of the portable computing apparatus and/or a running of the operating system (OS), and the second display mode does not require a booting of the portable computing apparatus and/or a running of the OS.

2. The portable computing apparatus as claimed in claim 1, wherein the first display module displays the first display mode and the second display mode.

3. The portable computing apparatus as claimed in claim 1, wherein the second display module displays the first display mode and the second display mode.

4. The portable computing apparatus as claimed in claim 1, wherein the second display module displays the second display mode when a specific event occurs.

5. The portable computing apparatus as claimed in claim 4, further comprising an event detection module to detect an occurrence of the specific event.

6. The portable computing apparatus as claimed in claim 5, wherein the event detection module determines the specific event to have occurred when a predetermined key signal is detected.

7. The portable computing apparatus as claimed in claim 6, wherein the predetermined key signal is output from a specific button provided on the portable computing apparatus.

8. The portable computing apparatus as claimed in claim 5, wherein the specific event is a closing of a cover of the portable computing apparatus.

9. The portable computing apparatus as claimed in claim 1, wherein the second display mode comprises a predetermined function list comprising functions that process without depending on an Operating System (OS) of the portable computing apparatus and/or without requiring a booting of the portable computing apparatus.

10. The portable computing apparatus as claimed in claim 9, wherein the predetermined function list comprises at least one of a system management function, the BIOS setting function, and/or an Operating System (OS) setting function.

11. The portable computing apparatus as claimed in claim 9, further comprising a second input module to receive, from a user, at least one of a predetermined control command and/or a function selection from the predetermined function list.

12. The portable computing apparatus as claimed in claim 11, wherein the second input module receives, from the user, functions selected by the user to add to the predetermined function list.

13. The portable computing apparatus as claimed in claim 11, wherein the second input module is provided on an outer surface of a cover of the portable computer and/or adjacent to the second display module.

14. The portable computing apparatus as claimed in claim 11, wherein the second input module comprises one or more buttons and/or a touch screen.

15. The portable computing apparatus as claimed in claim 9, further comprising:
   a management module to provide the predetermined function list to the second display module; and
   a processing module to process a function selected from the predetermined function list by a user.

16. A processing method of a portable computing apparatus including a first display module and a second display module, the method comprising:
   displaying a first display mode on the first display module when the portable computing apparatus is booted and/or an OS is running;
   providing a second display mode with a predetermined function list comprising functions that process without depending on an Operating System (OS) of the portable computing apparatus and/or without requiring a booting of the portable computing apparatus;
   displaying the second display mode on the second display module when a specific event occurs; and
   processing a function selected by a user from the predetermined function list.

17. The processing method as claimed in claim 16, further comprising determining that the specific event has occurred when closing of a cover of the portable computing apparatus is detected.

18. The processing method as claimed in claim 16, further comprising determining that the specific event has occurred when a predetermined key signal is detected.

19. The processing method as claimed in claim 18, wherein the determining that the specific event has occurred further comprises outputting of the predetermined key signal from a specific button provided on the portable computing apparatus.

20. The processing method as claimed in claim 16, wherein the predetermined function list comprises at least one of a system management function, a BIOS setting function, and/or an OS setting function.

21. The processing method as claimed in claim 20, wherein the system management function comprises at least one of a disk defragmentation function and/or a computer task scheduling function.

22. The processing method as claimed in claim 20, wherein the BIOS setting function comprises at least one of a BIOS initial value restoring function and/or a low-noise setting function.

23. The processing method as claimed in claim 20, wherein the OS setting function comprises at least one of a data execution prevention setting function and/or a quick view function.

24. The processing method as claimed in claim 16, further comprising adding functions selected by the user to the predetermined function list.

* * * * *